(12) United States Patent
Eguchi

(10) Patent No.: US 9,316,767 B2
(45) Date of Patent: Apr. 19, 2016

(54) METHOD OF MANUFACTURING MICROLENS ARRAY SUBSTRATE, MICROLENS ARRAY SUBSTRATE, ELECTRO-OPTIC DEVICE, AND ELECTRONIC

(71) Applicant: Seiko Epson Corporation, Tokyo (JP)

(72) Inventor: Yoshikazu Eguchi, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 37 days.

(21) Appl. No.: 14/480,984

(22) Filed: Sep. 9, 2014

(65) Prior Publication Data

US 2015/0092139 A1   Apr. 2, 2015

(30) Foreign Application Priority Data

Sep. 27, 2013   (JP) .................................. 2013-201053

(51) Int. Cl.
| | |
|---|---|
| *G02B 3/00* | (2006.01) |
| *G03B 21/00* | (2006.01) |
| *G02F 1/1335* | (2006.01) |
| *G03B 21/20* | (2006.01) |
| *G03B 33/12* | (2006.01) |

(52) U.S. Cl.
CPC ............ *G02B 3/0018* (2013.01); *G02B 3/0025* (2013.01); *G02F 1/133526* (2013.01); *G03B 21/006* (2013.01); *G03B 21/208* (2013.01); *G03B 21/2073* (2013.01); *G03B 33/12* (2013.01)

(58) Field of Classification Search
CPC .. G02B 3/0018; G02B 3/0025; G03B 21/208; G03B 33/12; G03B 21/2073; G03B 21/006
See application file for complete search history.

(56) References Cited

U.S. PATENT DOCUMENTS

| | | | |
|---|---|---|---|
| 6,970,212 B1 | 11/2005 | Gomi | |
| 7,715,104 B2 | 5/2010 | Abe et al. | |
| 7,978,413 B2 | 7/2011 | Abe et al. | |

FOREIGN PATENT DOCUMENTS

| | | |
|---|---|---|
| JP | 2000-029011 A | 1/2000 |
| JP | 2005-292583 A | 10/2005 |
| JP | 2009-271468 A | 11/2009 |
| JP | 2009-294363 A | 12/2009 |

*Primary Examiner* — Joseph L Williams
(74) *Attorney, Agent, or Firm* — ALG Intellectual Property, LLC

(57) ABSTRACT

There is provided a method of manufacturing a microlens array substrate with improved manufacturing yield and high quality, the method including: forming a groove part along an outer edge of a first area on a surface of a substrate; forming a mask layer to cover a side of the surface, forming a plurality of openings in the first area, and forming openings along the outer edge of the first area; performing isotropic etching on the substrate through the mask layer, forming a plurality of recesses in the first area, and forming recesses across a boundary part between the first area and the groove part; removing the mask layer from the substrate; forming a light transmission material layer that has a refractive index, which is different from a refractive index of the substrate, to cover the side of the surface of the substrate and to bury the plurality of recesses; and planarizing an upper surface of the light transmission material layer.

11 Claims, 10 Drawing Sheets

METHOD OF MANUFACTURING MICROLENS ARRAY SUBSTRATE, MICROLENS ARRAY SUBSTRATE, ELECTRO-OPTIC DEVICE, AND ELECTRONIC

BACKGROUND

1. Technical Field

The present invention relates to a method of manufacturing a microlens array substrate, a microlens array substrate, an electro-optic device, and an electronic apparatus.

2. Related Art

An electro-optic device, which includes an electro-optic material (for example, liquid crystal or the like) between an element substrate and a counter substrate, has been known. For example, a liquid crystal device, which is used as a liquid crystal light valve of a projector, can be described as the electro-optic device. In such a liquid crystal device, it is required to realize high light use efficiency. Here, a configuration has been known in which, when the liquid crystal device includes a microlens array substrate, light incident to the liquid crystal device is condensed and light, shielded by a light shielding layer if the light is not condensed, is used, and thus a substantial opening ratio of the liquid crystal device is improved.

The microlens array substrate includes a substrate in which a plurality of recesses are formed on a surface and which is formed of quartz, and a lens layer which is formed to cover the substrate and which has a refractive index different from that of the substrate. In the microlens array substrate, a plurality of microlenses are formed by burying the plurality of recesses in the substrate using a lens layer. The lens layer is formed of a resin material or an inorganic material, and an upper surface of the lens layer is planarized by providing, for example, a cover member, or performing a planarizing process such as a Chemical Mechanical Polishing (CMP) process.

However, with regard to a display area in which the plurality of recesses are formed to be dug down from the surface of the substrate, the upper surface of the lens layer is high in a peripheral area, which is on the outer side of the display area and in which the recesses are not formed, and thus a step is generated on the upper surface of the lens layer. If the step on the upper surface of the lens layer is large, the increase in man hour or the deterioration in evenness of the upper surface of the lens layer is caused when the planarizing process is performed on the upper surface of the lens layer.

In contrast, a method of manufacturing a microlens array substrate (for example, refer to JP-A-2009-294363) is proposed to reduce the difference in thickness of a lens layer (resin layer), that is, to reduce a step on an upper surface of the lens layer by providing a groove part (depressed part) in a peripheral area (lens non-formation area) of a substrate and lowering the height of a non-display area than that of a display area (lens formation area) of the substrate.

According to the manufacturing method disclosed in JP-A-2009-294363, wet etching is performed on the substrate through a mask layer (first hard mask film) which covers only the display area of the substrate, the groove part, which is depressed toward a lower part than the substrate surface of the display area, is formed in the peripheral area, and then the mask layer is removed. Further, the wet etching is performed on the substrate through a mask layer (second hard mask film), which covers the whole surface of the substrate and in which a plurality of openings are provided in the display area, a plurality of recesses are formed in the display area, and then the mask layer is removed.

However, in the manufacturing method disclosed in JP-A-2009-294363, before the mask layer (second hard mask film) is formed to form the plurality of recesses in the display area, a step is formed by the groove part in the boundary of the display area and the peripheral area of the substrate. Therefore, when the mask layer (second hard mask film), which is formed on the whole surface of the substrate, is removed, there is a problem in that a part of the mask layer is not removed and remains at a corner of the step, more specifically, a corner of the bottom surface and the side wall of the groove part. When a part of the mask layer remains, there are cases in which an upper lens layer is peeled together with the remaining mask layer and in which cracks appear in the lens layer because stress is applied to the remaining mask layer. Therefore, a method of manufacturing the microlens array substrate is required which is capable of performing removal such that the mask layer, which is necessary to form the plurality of recesses, does not remain in the display area even when the groove part is provided in the peripheral area of the substrate in order to reduce the step on the upper surface of the lens layer.

SUMMARY

The invention can be implemented as application examples.

Application Example 1

According to this application example, there is provided a method of manufacturing a microlens array substrate in which a plurality of microlenses are arranged in a first area, the method including: forming a groove part along an outer edge of the first area on a first surface of a substrate; forming a first mask layer to cover a side of the first surface of the substrate, forming a plurality of first openings corresponding to the plurality of microlenses in the first area of the first mask layer, and forming second openings along the outer edge of the first area; performing isotropic etching on the substrate through the first mask layer, forming a plurality of first recesses corresponding to the plurality of first openings in the first area, and forming second recesses corresponding to the second openings across an edge part on a side of the first area of the groove part; removing the first mask layer from the substrate; forming a light transmission material layer that has a refractive index, which is different from a refractive index of the substrate, to cover the side of the first surface of the substrate and to bury the plurality of first recesses and the second recesses; and planarizing an upper surface of the light transmission material layer.

In the manufacturing method according to the application example, the groove part is formed along the outer edge of the first area in which the plurality of microlenses are arranged. Therefore, if the light transmission material layer is formed to cover the side of the first surface of the substrate and to bury the plurality of first recesses, a step between the first area, which is generated on the upper surface of the light transmission material layer and a peripheral area thereof in which the groove part is formed, is reduced and is less than a step between the first surface of the substrate and the groove part, compared to a case in which the groove part is formed in the outer edge of the first area. Therefore, in the planarizing of the upper surface of the light transmission material layer, it is possible to reduce man hour when the planarizing is performed, and it is possible to improve evenness on the upper surface of the light transmission material layer.

Further, in the performing of the isotropic etching on the substrate through the first mask layer and forming the plurality of first recesses in the first area, the second recesses are formed across the edge part on the side of the first area of the groove part. Therefore, in a portion where the second recesses are formed at a corner of a step of the first surface of the substrate and the groove part, that is, at a corner of the bottom surface and a side wall of the groove part, a cavity part is generated on a lower side of the first mask layer. Therefore, in the removing of the first mask layer from the substrate, it is possible to properly remove the first mask layer even at the corner of the bottom surface and the side wall of the groove part. Therefore, it is possible to provide the method of manufacturing the microlens array substrate, which is capable of removing the first mask layer such that a part of the first mask layer does not remain even when the groove part is provided in the outer edge of the first area in order to reduce the step on the upper surface of the light transmission material layer.

Application Example 2

In the method of manufacturing the microlens array substrate according to the application example, the forming of the groove part may include: forming a second mask layer that covers the first area of the first surface of the substrate; forming the groove part by performing anisotropic etching on the substrate through the second mask layer; and removing the second mask layer.

In the manufacturing method according to the application example, when the anisotropic etching is performed on the substrate through the second mask layer which covers the first area, the groove part is formed along the outer edge of the first area. Therefore, compared to a case in which the isotropic etching is performed, the evenness of the bottom surface of the groove part is improved, and thus it is possible to improve the evenness of the upper surface of the light transmission material layer which is formed to cover the side of the first surface of the substrate. In contrast, since the groove part is formed by performing the anisotropic etching, the corner of the bottom surface and the side wall of the groove part is steep compared to the case in which the groove part is formed by performing the isotropic etching. Therefore, in the removing of the first mask layer from the substrate, a part of the first mask layer easily remains at the corner of the bottom surface and the side wall of the groove part. However, since the cavity part is generated on the lower side of the first mask layer at the corner due to the second recesses, it is possible to perform removing such that a part of the first mask layer does not remain at the corner.

Application Example 3

In the method of manufacturing the microlens array substrate according to the application example, the removing of the first mask layer may include performing anisotropic etching on the first mask layer.

In the manufacturing method according to the application example, the first mask layer is removed by performing the anisotropic etching. Therefore, compared to the case in which the isotropic etching is performed, a part of the first mask layer is prone to remain at the corner of the bottom surface and the side wall of the groove part. However, since the cavity part is generated on the lower side of the first mask layer at the corner due to the second recesses, it is possible to perform removing such that a part of the first mask layer does not remain even when the anisotropic etching is performed.

Application Example 4

In the method of manufacturing the microlens array substrate according to the application example, the second openings may be arranged to extend along the outer edge of the first area.

In the manufacturing method according to the application example, the second openings are arranged to extend along the outer edge of the first area in the first mask layer. Therefore, since the second recesses are formed to extend along the outer edge of the first area on the lower side of the first mask layer at the corner of the bottom surface and the side wall of the groove part, the cavity part which extends to the lower side of the first mask layer is generated at the corner. Therefore, it is possible to properly remove the first mask layer at the corner of the bottom surface and the side wall of the groove part.

Application Example 5

In the method of manufacturing the microlens array substrate according to the application example, the forming of the second openings may include forming a plurality of second openings along the outer edge of the first area, and an interval between the plurality of second openings may be smaller than an interval between the plurality of first openings.

In the manufacturing method according to the application example, the plurality of second openings are arranged along the outer edge of the first area of the first mask layer, and the interval between the second openings is smaller than the interval between the first openings. Therefore, the plurality of second recesses are formed on the lower side of the first mask layer at the corner of the bottom surface and the side wall of the groove part along the outer edge of the first area in higher density than the first recesses. Therefore, since the cavity part which is connected to on another due to the plurality of second recesses is generated at the corner of the bottom surface and the side wall of the groove part, it is possible to further properly remove the first mask layer.

Application Example 6

In the method of manufacturing the microlens array substrate according to the application example, the second openings may be arranged in an area which is overlapped with the groove part in a planar view.

In the manufacturing method according to the application example, in the first mask layer, the second openings are arranged in the area which is overlapped with the groove part in a planar view. That is, the second openings are provided on the bottom surface of the groove part which is a lower part than the first openings provided on the first surface of the substrate. Therefore, compared to a case in which the second openings are arranged in the first area, it is possible to form the second recesses, which are formed to correspond to the second openings, in a part lower than the corner of the bottom surface and the side wall of the groove part, and thus it is possible to cause the cavity part on the lower side of the first mask layer at the corner to be larger. Therefore, it is possible to more properly remove the first mask layer at the corner of the bottom surface and the side wall of the groove part.

Application Example 7

In the method of manufacturing the microlens array substrate according to the application example, a distance between a boundary part and the second openings may be equal to or less than a difference between a step of the first surface and the groove part and a depth of the first recess.

In the manufacturing method according to the application example, the distance between the boundary part of the first area and the groove part and the second openings which are arranged in the groove part is equal to or less than the difference between the step of the first surface and the groove part and the depth of the first recess. That is, the second openings are arranged in a position in the vicinity of the corner of the bottom surface and the side wall of the groove part. Therefore, it is possible to form the second recesses while the position which is in the vicinity of the corner of the bottom surface and the side wall of the groove part is used as a central position, and thus it is possible to more properly remove the first mask layer at the corner.

Application Example 8

In the method of manufacturing the microlens array substrate according to the application example, the second openings may be arranged in the first area.

In the manufacturing method according to the application example, the second openings are arranged in the first area of the first mask layer. That is, the second openings are formed at the same height as the first openings which are provided on the first surface of the substrate. Therefore, in a case of exposure when the first openings and the second openings are formed in the first mask layer, a distance from an exposure machine to a position in which the openings are formed can be substantially the same between the first openings and the second openings. Therefore, the positions of the second openings and the precision in a size of a diameter can be the same as those of the first openings.

Application Example 9

According to this application example, there is provided a microlens array substrate including: a substrate; a plurality of first recesses that are provided in a first area of a first surface of the substrate; a groove part that is provided along an outer edge of the first area; second recesses that is provided across a boundary part between the first area and the groove part; and a light transmission layer that has a refractive index, which is different from a refractive index of the substrate, and that is provided to cover the first surface of the substrate and to bury the plurality of first recesses and the second recesses.

In the microlens array substrate according to the application example, the groove part is provided along the outer edge of the first area in which the plurality of first recesses are provided. Therefore, if the material of the light transmission layer is accumulated to cover the side of the first surface of the substrate and to bury the plurality of first recesses in the manufacturing the microlens array substrate, a step between the first area, which is generated on the upper surface of the material of the light transmission layer, and a peripheral area in which the groove part is formed is reduced and becomes small due to a step between the first surface and the groove part of the substrate, compared to a case in which the groove part is not formed in the outer edge of the first area. Therefore, it is possible to reduce man hour when a planarizing process to planarize the upper surfaces of the accumulated materials of the light transmission layer is performed and it is possible to improve the evenness of the upper surface of the light transmission material layer.

Further, the second recesses are provided across the boundary part of the first area and the groove part. Therefore, when the first recesses and the second recesses are formed through the mask layer and then the mask layer is removed, a cavity part is generated toward a lower side of the mask layer in a portion in which the second recesses are provided at a corner of the step of the first surface and the groove part of the substrate, that is, at a corner of a bottom surface and a side wall of the groove part. Therefore, it is possible to properly remove the mask layer even at the corner of the bottom surface and the side wall of the groove part. Therefore, it is possible to improve the evenness of the upper surface of the light transmission layer, and it is possible to provide the microlens array substrate with improved manufacturing yield and high quality.

Application Example 10

According to the application example, there is provided an electro-optic device including: a first substrate; a second substrate that is arranged to face the first substrate; an electro-optic layer that is arranged between the first substrate and the second substrate; and the microlens array substrate according to the application example that is provided on at least one of the first substrate and the second substrate.

In the electro-optic device according to the application example, since the electro-optic device includes the light transmission layer in which the evenness of the upper surface is improved and includes a the microlens array substrate which has improved manufacturing yield and high quality on at least one of the first substrate and the second substrate, it is possible to provide an electro-optic device with high quality and brightness.

Application Example 11

According to this application example, there is provided an electronic apparatus including the electro-optic device according to the application example.

In the electronic apparatus according to the application example, it is possible to provide an electronic apparatus with high quality and brightness.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
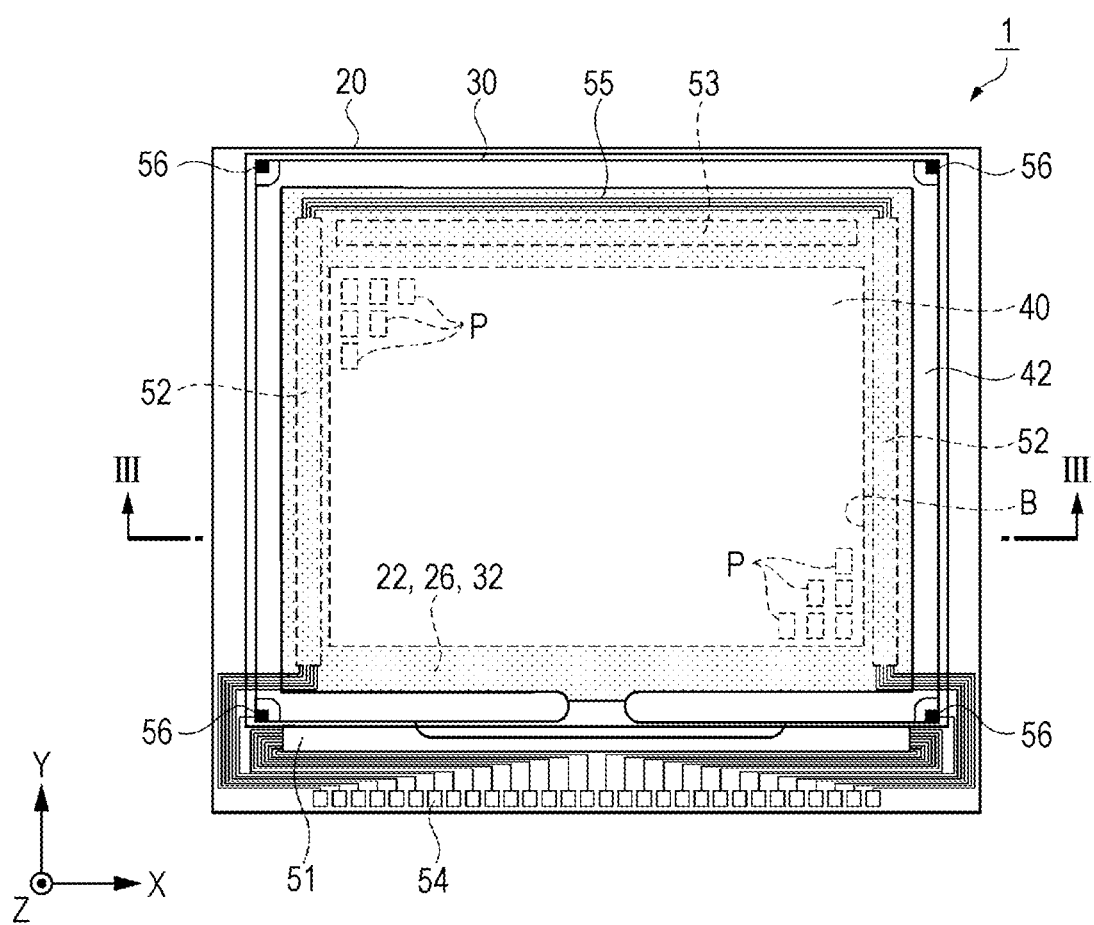
FIG. 1 is a schematic plan view illustrating a configuration of a liquid crystal device according to a first embodiment.

Hereinafter, embodiments which implement the invention will be described with reference to the accompanying drawings. The accompanying drawings are displayed by being appropriately enlarged, reduced, or exaggerated such that a portion to be described is in a recognizable state. In addition, there is a case in which unnecessary components for description are not shown in the drawing.

Meanwhile, in forms below, a case of a description of, for example, "on a substrate" indicates a case in which a substance is arranged to comes into contact with the substrate, a case in which the substance is arranged on the substrate through another component, and a case in which the substance includes a part that is arranged to come into contact with the substrate and the part is arranged through another component.

First Embodiment

Electro-Optic Device

Here, as an electro-optic device, an active matrix type liquid crystal device which includes a Thin Film Transistor (TFT) as a switching element for a pixel will be described as an example. The liquid crystal device can be suitably used as, for example, an optical modulation element (liquid crystal light valve) of a projection type display apparatus (projector) which will be described later.

Figure 2:
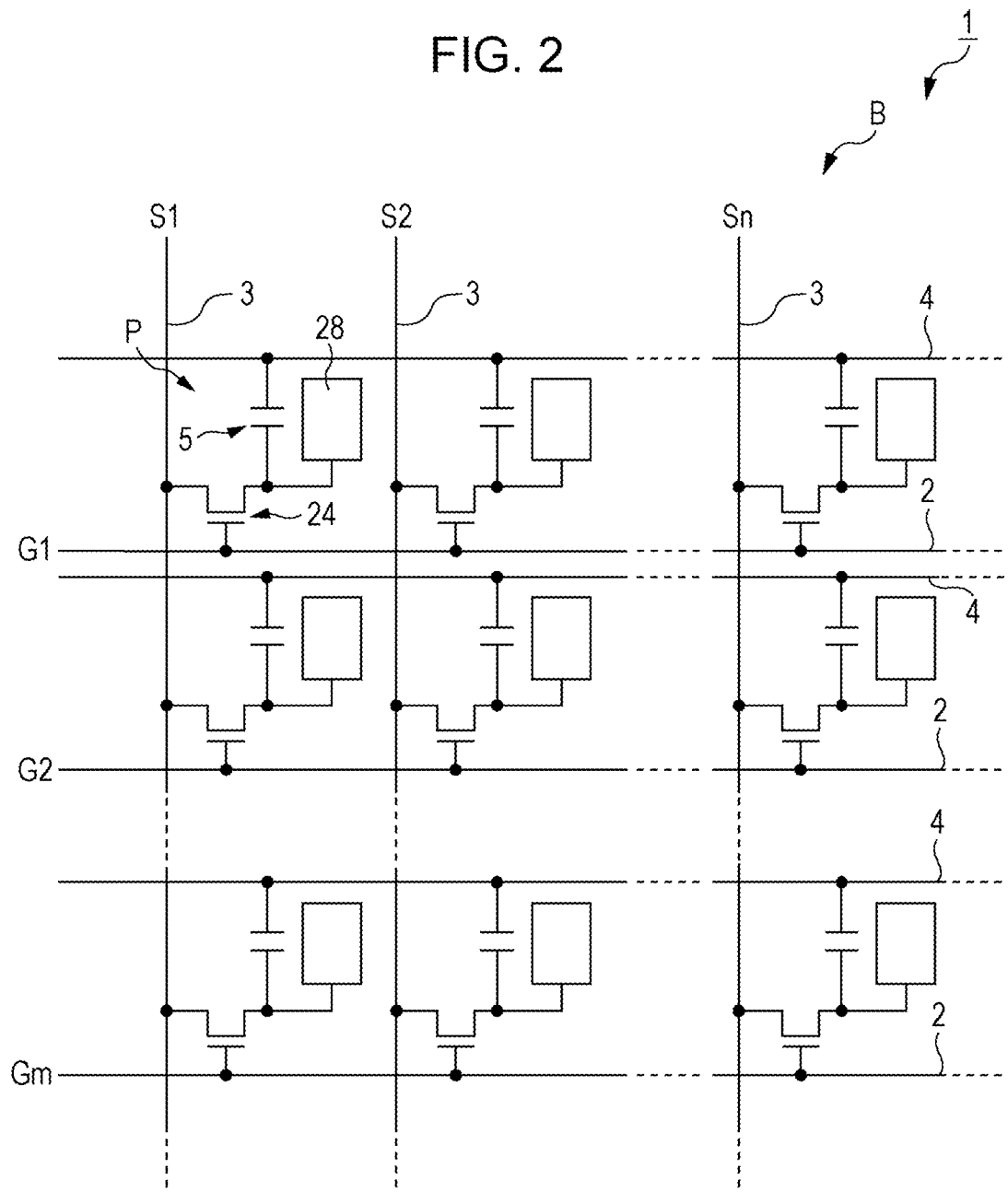
FIG. 2 is an equivalent circuit diagram illustrating an electrical configuration of the liquid crystal device according to the first embodiment.
Figure 3:
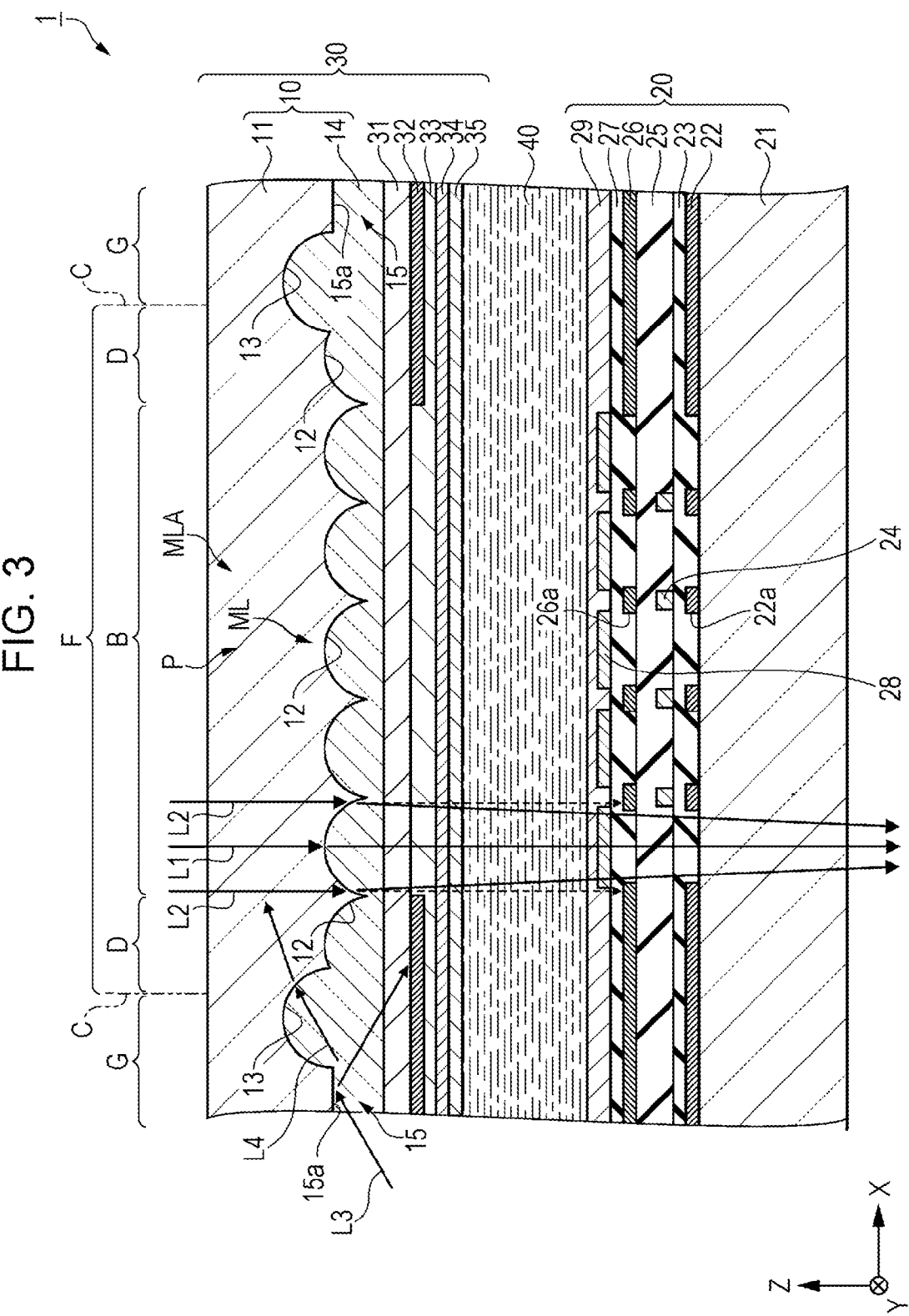
FIG. 3 is a schematic cross-sectional diagram illustrating the configuration of the liquid crystal device according to the first embodiment.

First, a liquid crystal device as an electro-optic device according to a first embodiment will be described with reference to FIGS. 1, 2, and 3. FIG. 1 is a schematic plan view illustrating a configuration of the liquid crystal device according to the first embodiment. FIG. 2 is an equivalent circuit diagram illustrating an electrical configuration of the liquid crystal device according to the first embodiment. FIG. 3 is a schematic cross-sectional diagram illustrating the configuration of the liquid crystal device according to the first embodiment. More specifically, FIG. 3 is a schematic cross-sectional diagram illustrating taken along a line III-III of FIG. 1.

As shown in FIGS. 1 and 3, an liquid crystal device 1 as the electro-optic device according to the first embodiment includes an element substrate 20 as a first substrate, a counter substrate 30 as a second substrate which is arranged to face the element substrate 20, and a liquid crystal layer 40 as an electro-optic layer which is arranged between the element substrate 20 and the counter substrate 30. As shown in FIG. 1, the element substrate 20 is greater than the counter substrate 30, and both the substrates are bonded to each other through a sealing material 42 which is arranged in a frame shape along an edge part of the counter substrate 30.

The liquid crystal layer 40 is formed of liquid crystal which is sealed in a space surrounded by the element substrate 20, the counter substrate 30, and the sealing material 42 and which has positive or negative dielectric anisotropy. The sealing material 42 includes, for example, an adhesive agent such as a thermosetting or ultraviolet curable epoxy resin or the like. The sealing material 42 is provided with a spacer (not shown in the drawing) for holding a uniform interval between the element substrate 20 and the counter substrate 30.

Light shielding layers 22, 26, and 32 which include a frame-shaped peripheral part are provided in the inner side of the sealing material 42 which is arranged to have the frame shape. The light shielding layers 22, 26, and 32 are formed of, for example, light shielding metal or metallic oxide. The inner sides of the light shielding layers 22, 26, and 32 correspond to a display area B, in which a plurality of pixels P are arranged. The pixels P have, for example, a substantially rectangular shape and are arranged in a matrix shape.

The display area B is an area which substantially contributes to display in the liquid crystal device 1. The light shielding layers 22 and 26 are provided in, for example, a lattice shape along the boundary of adjacent pixels P in the display area B. Meanwhile, the liquid crystal device 1 may include a dummy area which is provided to surround the periphery of the display area B on the outside (outer peripheral end side) of the display area B.

On a side opposite to the display area B of the sealing material 42 which is formed along a first side of the element substrate 20, a data line drive circuit 51 and a plurality of external connection terminals 54 are provided along the first side. In addition, on a side of the display area B of the sealing material 42 along a second side which is opposite to the first side, an inspection circuit 53 is provided. Further, scan line drive circuits 52 are provided on the inner side of the sealing material 42 along another two sides which are perpendicular to the two sides and which are face to each other.

On the side of the display area B of the sealing material 42 of the second side on which the inspection circuit 53 is provided, a plurality of wirings 55, which connect the two scan line drive circuits 52, are provided. The wirings which are connected to the data line drive circuit 51 and the scan line drive circuits 52 are connected to the plurality of external connection terminals 54. In addition, vertical conduction units 56 are provided at the corners of the counter substrate 30 for electrical conduction between the element substrate 20 and the counter substrate 30. Meanwhile, the arrangement of the inspection circuit 53 is not limited thereto, and may be provided in a position along the inner side of the sealing material 42 between the data line drive circuit 51 and the display area B.

In the description below, a direction along the first side on which the data line drive circuit 51 is provided is an X direction as a first direction, and a direction along the other two sides which are perpendicular to the first side and face each other is a Y direction as a second direction. The X direction is a direction taken along a line III-III of FIG. 1. In addition, a direction which is perpendicular to the X direction and the Y direction and which face an upper side in FIG. 1 is a Z direction. Meanwhile, in the specification, a view of the liquid crystal device 1 from a normal line direction (Z direction) of a surface of an outside of the counter substrate 30 is called "planar view".

As shown in FIG. 2, in the display area B, scan lines 2 and data lines 3 are formed to cross each other, and the pixels P are provided to correspond to the cross of the scan lines 2 and the data lines 3. Each of the pixels P is provided with a pixel electrode 28, and a TFT 24 as a switching element.

The TFT 24 includes a source electrode which is electrically connected to the data line 3 extended from the data line drive circuit 51. Image signals (data signals) S1, S2, ..., Sn from the data line drive circuit 51 (refer to FIG. 1) are line sequentially supplied to the data line 3. The TFT 24 includes a gate electrode which is a part of the scan line 2 extended from the scan line drive circuits 52 (refer to FIG. 1). Scan signals G1, G2, ..., Gm from the scan line drive circuits 52 are line sequentially supplied to the scan line 2. The TFT 24 includes a drain electrode which is electrically connected to the pixel electrode 28.

The image signals S1, S2, ..., Sn are written in the pixel electrode 28 through the data line 3 at a predetermined timing by causing the TFT 24 to be an on state only for a uniform period. In this manner, the image signal, which is written in the liquid crystal layer 40 (refer to FIG. 3) through the pixel electrode 28 at a predetermined level, is held in a liquid crystal capacity, which is formed between common electrodes 34 (refer to FIG. 3) provided in the counter substrate 30, for a uniform period. When a voltage signal is applied to liquid crystal of each pixel P, a liquid crystal oriented state changes based on a level of the applied voltage. Therefore, light which is incident to the liquid crystal layer 40 is modulated, and thus tone display is possible.

Meanwhile, in order to prevent the held image signals S1, S2, ..., Sn from leaking, a storage capacity 5 is provided to be parallel to the liquid crystal capacity. In order to form the storage capacity 5, a capacity line 4 is formed along the scan line 2. The capacity line 4 is connected to a common potential line (COM) and is held with predetermined potential.

As shown in FIG. 3, the element substrate 20 includes a light shielding layer 22, an insulation layer 23, the TFT 24, an insulation layer 25, a light shielding layer 26, an insulation layer 27, the pixel electrode 28, and an oriented film 29 on a substrate 21. The substrate 21 is formed of, for example, a transparent material such as glass or quartz.

The light shielding layer 22 is formed of, for example, a light shielding material such as Mo (molybdenum), W (tungsten), Ti (titanium), TiN (titanium nitride), or Cr (chromium). The light shielding layer 22 is formed in a lattice shape so as to overlap with the light shielding layer 26 in the upper layer in a planar view. The light shielding layer 22 and the light shielding layer 26 are arranged to interpose the TFT 24 in the thickness direction (Z direction) of the element substrate 20. The light shielding layer 22 overlaps with at least channel area of the TFT 24 in a planar view.

When the light shielding layer 22 and the light shielding layer 26 are provided, light incident to the TFT 24 is suppressed. An area (inside of an opening 22a) which is enclosed by the light shielding layer 22 and an area (inside of an opening 26a) which is enclosed by the light shielding layer 26 are areas through which light passes in the pixel P. Meanwhile, the light shielding layer 22 includes a plurality of light shielding films, and may be formed in a lattice shape to compensate with each other.

The insulation layer 23 is provided to cover the substrate 21 and the light shielding layer 22. The insulation layer 23 is formed of, for example, an inorganic material such as $SiO_2$.

The TFT 24 is formed on the insulation layer 23. The TFT 24 is a switching element which drives the pixel electrode 28. The TFT 24 includes a semiconductor layer which is not shown in the drawing, the gate electrode, the source electrode, and the drain electrode. In the semiconductor layer, a source area, a channel area, and a drain area are formed. On the boundary surface between the channel area and the source area or between the channel area and the drain area, a Lightly Doped Drain (LDD) area may be formed.

The gate electrode is formed in an area which overlaps with the channel area of the semiconductor layer in the element substrate 20 through a part (gate insulation film) of the insulation layer 25 in a planar view. Although not shown in the drawing, the gate electrode is electrically connected to the scan line which is arranged on a lower layer side through a contact hole, and control is performed such that the TFT 24 is turned on or off when the scan signal is applied.

The insulation layer 25 is provided to cover the insulation layer 23 and the TFT 24. The insulation layer 25 is formed of, for example, an inorganic material such as $SiO_2$. The insulation layer 25 includes a gate insulation film which insulates between the semiconductor layer and the gate electrode of the TFT 24. Irregularities, which are generated due to the TFT 24, on a surface is reduced by the insulation layer 25. The light shielding layer 26 is provided on the insulation layer 25. Further, the insulation layer 27, which is formed of an inorganic material, is provided to cover the insulation layer 25 and the light shielding layer 26.

The pixel electrode 28 is provided to correspond to the pixel P on the insulation layer 27. The pixel electrode 28 is provided in an area which overlaps with the opening 22a of the light shielding layer 22 and the opening 26a of the light shielding layer 26 in a planar view. The pixel electrode 28 is formed of, for example, a transparent conductive film such as Indium Tin Oxide (ITO) or Indium Zinc Oxide. The oriented film 29 is provided to cover the pixel electrode 28.

Meanwhile, the TFT 24 and an electrode or a wiring (not shown in the drawing), which supplies an electrical signal to the TFT 24, are provided in an area which overlaps with the light shielding layer 22 and the light shielding layer 26 in a planar view. The electrode, the wiring and the like may be configured to combine with the light shielding layer 22 and the light shielding layer 26.

The counter substrate 30 includes a microlens array substrate 10, an optical path adjustment layer 31, a light shielding layer 32, a protective layer 33, the common electrode 34, and an oriented film 35.

Microlens Array Substrate

The microlens array substrate 10 includes a substrate 11 and a lens layer 14 as a light transmission layer. The microlens array substrate 10 is arranged such that a side of the lens layer 14 faces the element substrate 20.

The substrate 11 is formed of, for example, an inorganic material, such as glass or quartz, which has optical transparency. The substrate 11 includes a plurality of recesses 12 and a recess 13 which are formed on a surface which faces the element substrate 20. The plurality of recesses 12 are provided in the display area B and a dummy area D which surrounds the display area B. In the display area B, the plurality of recesses 12 are arranged to correspond to the respective pixels P. In the display area B, the plurality of recesses 12 may be provided to connect each other or provided apart from each other.

When the dummy area D, in which the recesses 12 are arranged is provided on the outside of the display area B, is provided, evenness of the surface of the lens layer 14, that is, the surface of the microlens array substrate 10 is improved in an outer peripheral portion of the display area B. Therefore, it is possible to cause the layer thickness of the liquid crystal layer 40 to be uniform in the display area B and it is possible to cause an optical condition, such as refraction of incident light, to be same, and thus it is possible to improve the image quality of the liquid crystal device 1. Meanwhile, the dummy area D is an area in which light is shielded by the light shielding layers 22, 26, and 32 and which does not contribute to the display. In addition, the TFT 24 of a dummy pixel may be provided to correspond to the recess 12 of the dummy area D. The recess 12 of the dummy area D may be provided in a plurality of rows along the edge of the display area B.

It is assumed that an area which includes the display area B and the dummy area D is a first area F. The pixels P are virtually arranged in the dummy area D at the same pitch as the display area B. The plurality of recesses 12 are arranged in the display area B and the dummy area D at an arrangement pitch corresponding to the arrangement pitch of the pixel P. Parts of the recesses 12, which are arranged on a side of an outermost peripheral area G of the dummy area D, are connected to the parts of the recess 13. The positions of the end parts of the pixels P corresponding to the recesses 12, which are arranged on the side of the outermost peripheral area G, form the outer edge of the dummy area D and become the outer edge of the first area F.

An area which surrounds the first area F (dummy area D) is a peripheral area G. The positions of the end parts of the pixels P corresponding to the recesses 12, which are arranged on the side of the outermost peripheral area G, form an inner edge of the peripheral area G. The peripheral area G is provided with a groove part 15 which includes a bottom surface 15a formed to be depressed from a surface 11a (refer to FIG. 4B) as a first surface of the substrate 11 along the outer edge of the first area F (dummy area D). The recess 13 is provided along the outer edge of the first area F, and is arranged across a boundary part C between the first area F (dummy area D) and the peripheral area G.

The recesses 12 and the recess 13 are formed in a substantially curved surface shape which tapers from a side of the liquid crystal layer 40 toward the base thereof. The recesses 12 and the recess 13 include a cross-sectional shape which has, for example, a substantially spherical surface shape. However, the cross-sectional shape may be a shape which includes a base having a substantially plat portion, or a shape which includes a peripheral part having a taper shaped portion. Meanwhile, some parts of the recesses 12, which are provided in the dummy area D, and a part of the recess 13, which is provided across the boundary part C between the dummy area D and the peripheral area G, are connected to each other. When a plurality of recesses 12 are provided in the dummy area D, at least a part of the recesses 12 which are arranged in the outermost peripheral area G is connected to at least a part of the recess 13.

The lens layer 14 is provided to cover the substrate 11 and to bury the plurality of recesses 12 and the recess 13. The lens layer 14 is formed of a material which has optical transparency and which has a photorefractive index different from the substrate 11. More specifically, the lens layer 14 is formed of an inorganic material which has the photorefractive index higher than the substrate 11. As such an inorganic material, for example, Silicon Oxy-nitride (SiON), alumina ($Al_2O_3$), borosilicate glass, and the like may be provided.

With the lens layer 14 which buries the plurality of recesses 12, convex microlenses ML are formed to correspond to the respective pixels P. In addition, a microlens array MLA is formed by the plurality of microlenses ML. Since the inorganic material which is used as a lens material of the lens layer 14 has excellent tolerance for light or high temperature rather than the resin material, it is possible to improve the reliability of the microlenses ML.

The optical path adjustment layer 31 is provided to cover the microlens array substrate 10. The optical path adjustment layer 31 is formed of, for example, an inorganic material which has approximately the same refractive index as the substrate 11. The optical path adjustment layer 31 has functions to planarize the surface of the microlens array substrate 10 and adjust distances from the microlenses ML to the light shielding layers 22 and 26 to desired values.

The light shielding layer 32 is provided in the dummy area D and the peripheral area G. The light shielding layer 32 may be also provided within the display area B, and may be formed in a lattice shape, an island shape, a stripe shape, or the like so as to overlap with the light shielding layers 22 and 26 of the element substrate 20 in a planar view. The protective layer 33 may be provided to cover the optical path adjustment layer 31 and the light shielding layer 32. The protective layer 33 covers the light shielding layer 32 such that a surface of the common electrode 34 on a side of the liquid crystal layer 40 is planarized.

The common electrode 34 is provided to cover the protective layer 33. The common electrode 34 is provided across the plurality of pixels P. The common electrode 34 is formed of, for example, a transparent conductive film such as Indium Tin Oxide (ITO) or Indium Zinc Oxide (IZO). The oriented film 35 is provided to cover the common electrode 34.

The liquid crystal layer 40 is interposed between the oriented film 29 on the side of the element substrate 20 and the oriented film 35 on the side of the counter substrate 30. The liquid crystal layer 40 is formed of liquid crystal which has positive or negative dielectric anisotropy. The liquid crystal which forms the liquid crystal layer 40 modulates light in such a way that the orientation or order of molecular assembly changes due to a level of a voltage to be applied, thereby enabling tone display. For example, in a case of a normally white mode, a transmittance for incident light decreases according to a voltage which is applied in units of each pixel P. In a case of normally black mode, the transmittance for incident light increases according to the voltage which is applied in units of each pixel P, and light which has contrast according to an image signal is emitted from the liquid crystal device 1 as a whole.

In the liquid crystal device 1, for example, light, which is emitted from a light source or the like, is incident from a side of the counter substrate 30 (substrate 11), which includes the microlenses ML, is refracted by the microlenses ML, and then condensed. For example, in light which is incident to the microlenses ML from the side of the substrate 11, incident light L1, which is incident along an optical axis passing through a planar center of an area of the pixel P, goes straight through the microlenses ML and is incident to the liquid crystal layer 40, passes through the liquid crystal layer 40, and is emitted to the side of the element substrate 20.

If incident light L2, which is incident to the peripheral part of the microlenses ML from an area overlapped with the light shielding layer 26 on the outer side than the incident light L1 in the planar view, straightly propagates, is shielded by the light shielding layer 26 as shown using a dotted line. However, due to the difference in the photorefractive index between the substrate 11 and the lens layer 14, incident light L2 is refracted toward a planar central side of the area of the pixels P. In the liquid crystal device 1, it is possible to cause the incident light L2, which is shielded by the light shielding layer 26 when straightly propagating, to be incident into the opening area (openings 26a) of the pixels P due to the converging operation of the microlenses ML and to pass through the liquid crystal layer 40. As a result, it is possible to cause the amount of light element emitted from the side of the substrate 20 to be large, and thus it is possible to increase utilization efficiency of light.

Meanwhile, since the lens layer 14 has a higher photorefractive index than the substrate 11, stay light L3, which is incident to the bottom surface 15a of the groove part 15 from a side part toward the upper side in an oblique direction, is totally reflected on the boundary surface of the lens layer 14 and the substrate 11, and is directed to the side of the liquid crystal layer 40 if an incident angle for the bottom surface 15a is equal to or greater than a critical angle. However, as shown in FIG. 3, since light is shielded in the light shielding layer 32, light is not incident to the display area B. In addition, although light L4, which is incident to the recess 13 from the same direction as the stay light L3, is refracted on the boundary surface of the lens layer 14 and the substrate 11, light L4 is not incident to the liquid crystal layer 40 because light L4 goes toward the upper side in the oblique direction.

In contrast, if the recess 13 is not provided and the bottom surface 15a of the groove part 15 is present up to the boundary part C of the first area F in the peripheral area G and if stay light L3 is incident to the bottom surface 15a in the vicinity of the boundary part C and is totally reflected on the boundary surface of the lens layer 14 and the substrate 11, there is a problem in that the stay light L3, which is reflected and goes toward the side of the liquid crystal layer 40, is not shielded by the light shielding layer 32 and is incident to the display area B. In the liquid crystal device 1 according to the embodiment, the recess 13 is provided in the peripheral area G, and thus it is possible to prevent the stay light L3, which is incident to the bottom surface 15a in the vicinity of the boundary part C, from being reflected and being incident to the display area B.

Method of Manufacturing Microlens Array Substrate

Substantially, a method of manufacturing the microlens array substrate 10 according to the first embodiment will be described with reference to FIGS. 4A to 6B. FIGS. 4A to 5D are schematic cross-sectional diagrams illustrating the method of manufacturing the microlens array substrate according to the first embodiment. FIGS. 6A and 6B are schematic diagrams illustrating a configuration of the first mask layer which is used for a process to manufacture the microlens array substrate according to the first embodiment. More specifically, FIG. 6A is a schematic plan view illustrating the configuration of the first mask layer, and FIG. 6B is a schematic cross-sectional diagram illustrating the configuration of the first mask layer.

In FIG. 6A, the upside and downside of the direction (Z direction) viewed in a plane manner is inversed with regard to FIG. 1. Each of FIGS. 4A to 5D and FIG. 6B corresponds to a cross-sectional diagram taken along a line VIB-VIB of FIG. 6A. In addition, in description of the method of manufacturing the microlens array substrate, the lower part side (Z direction) of FIG. 6B is called a "lower part".

Meanwhile, although not shown in the drawing, in the process to manufacture the microlens array substrate 10, the process is performed on a large-sized substrate (mother board) in which it is possible to acquire a plurality of pieces of the microlens array substrates 10, the mother board is finally cut and separated, and thus a plurality of microlens array substrates 10 are acquired. Therefore, in each process which will be described blow, a process is performed on a state of the mother board which is acquired before being separated. However, here, a process, which is performed on the individual microlens array substrate 10 of the mother board, will be described.

Figure 4A:
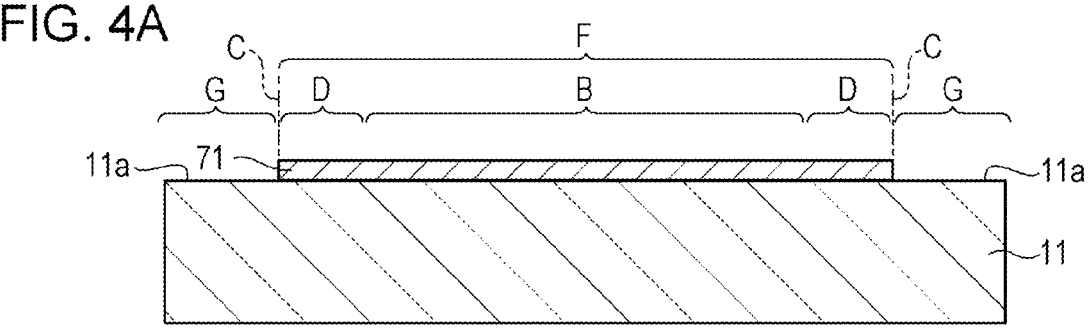
FIGS. 4A to 4D are schematic cross-sectional diagrams illustrating a method of manufacturing a microlens array substrate according to the first embodiment.
Figure 5A:
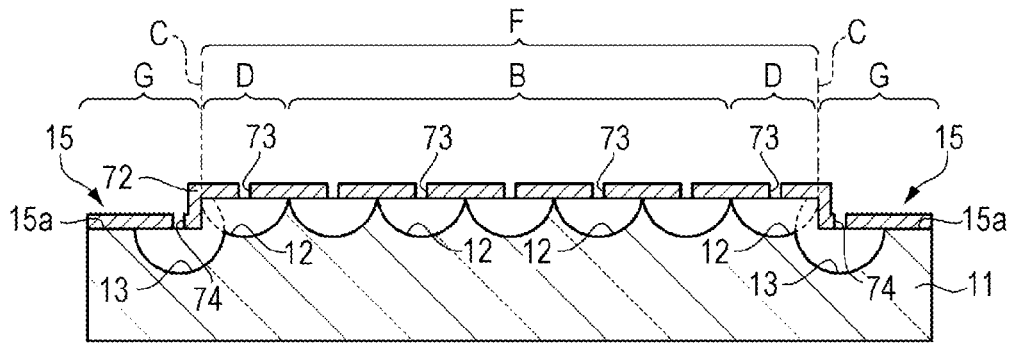
FIGS. 5A to 5D are schematic cross-sectional diagrams illustrating the method of manufacturing the microlens array substrate according to the first embodiment.

First, as shown in FIG. 4A, a mask layer 71 is formed as a second mask layer on the surface 11a of the substrate 11 which is formed of quartz and has optical transparency. The mask layer 71 is formed to cover the first area F (the display area B and the dummy area D) and expose the peripheral area G in the surface 11a of the substrate 11 by, for example, performing patterning using a photolithography method or the like in such a way as to provide a resist layer on an upper layer of the mask layer 71, and performing an anisotropic etching (dry etching) process using the resist layer as an etching mask.

Figure 4B:
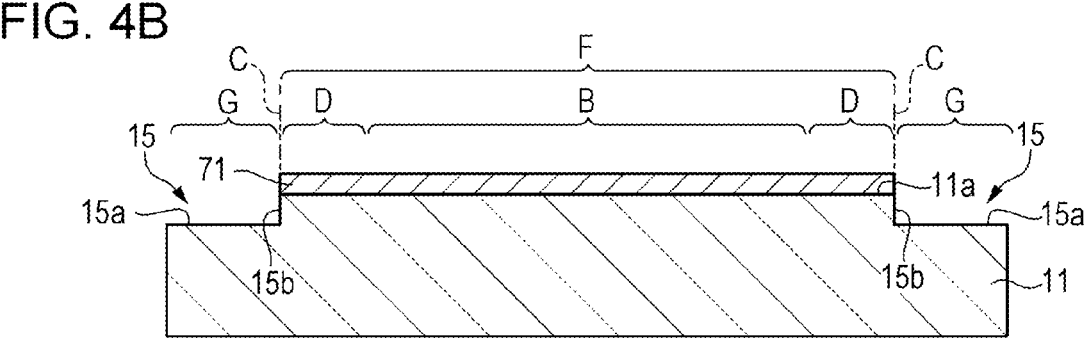

Substantially, as shown in FIG. 4B, the anisotropic etching (dry etching) process is performed on the peripheral area G, which is not covered by the mask layer 71, in the surface 11a of the substrate 11. Therefore, the groove part 15, which is depressed from the surface 11a of the substrate 11 toward the lower part, is formed to surround the first area F along the outer edge of the first area F. The groove part 15 is formed over, for example, the whole area of the peripheral area G.

Meanwhile, an end part of the separated microlens array substrate 10 is the outer edge of the peripheral area G. Therefore, the groove part 15 is formed up to the end part of the microlens array substrate 10. The groove part 15 includes a bottom surface 15a which is substantially parallel to the surface 11a of the substrate 11, and a side wall 15b which is positioned in a boundary part C between the first area F and peripheral area G and which connects the surface 11a to the bottom surface 15a. After the groove part 15 is formed, the mask layer 71 is removed from the substrate 11.

In a process to form the groove part 15 shown in FIG. 4B, an isotropic etching (wet etching) process can be performed. However, in the isotropic etching process, etching proceeds to spread toward a lower part and a lateral side from a portion in which the surface 11a is exposed. Therefore, there are cases in which the bottom surface 15a of the groove part 15 to be formed is not a flat surface and a case in which etching is performed up to a portion covered by the mask layer 71 and thus the groove part 15 enters the first area F beyond the boundary part C.

In contrast, when the anisotropic etching process is performed as in the embodiment, evenness of the bottom surface 15a of the groove part 15 is improved and, for example, the positional precision of the side wall 15b of the groove part 15 is improved, compared to a case in which the isotropic etching is performed. Meanwhile, when the anisotropic etching process is performed, the corner of the bottom surface 15a and the side wall 15b is steep, compared to the case in which the isotropic etching is performed.

Meanwhile, in the embodiment, an installed anisotropic etching process apparatus is used for a process to manufacture the TFT 24, and thus new introduction of the isotropic etching process apparatus is suppressed. Therefore, in a process in which the anisotropic etching process can be applied, the anisotropic etching process is performed.

Figure 4C:
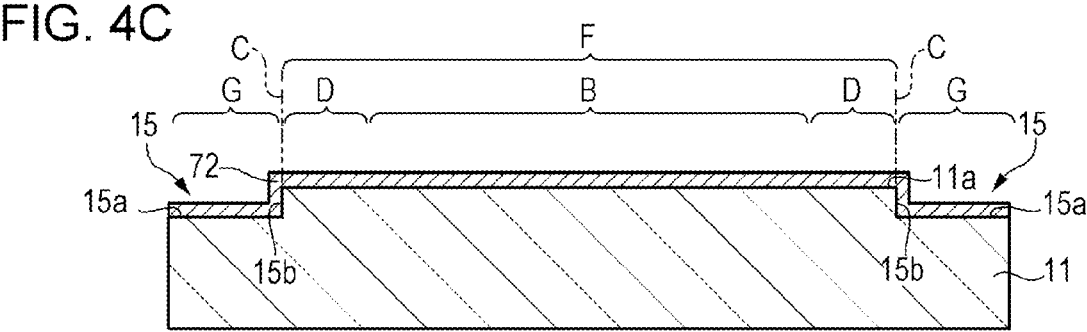

Substantially, as shown in FIG. 4C, a mask layer 72 is formed as the first mask layer throughout the first area F and the peripheral area G to cover the side of the surface 11a of the substrate 11. The mask layer 72 can be formed of, for example, poly-silicon, using a Chemical Vapor Deposition (CVD) method, a sputtering method, or the like. The mask layer 72 is formed to cover the surface 11a of the substrate 11, and the side wall 15b and the bottom surface 15a of the groove part 15.

Figure 4D:
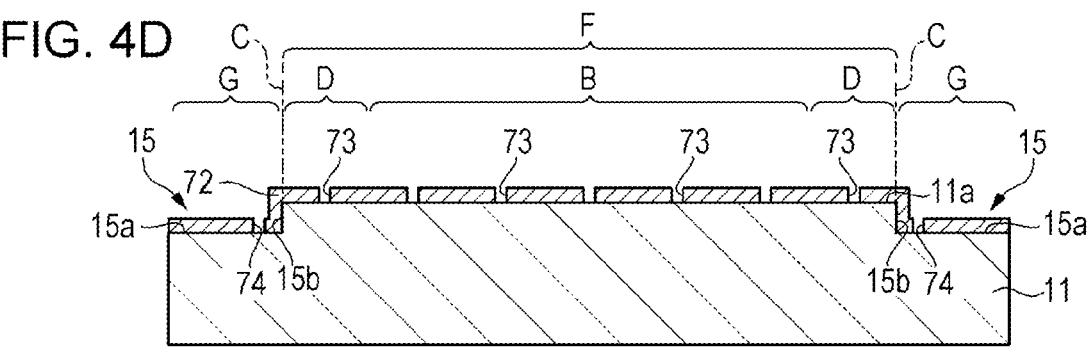

Subsequently, as shown in FIG. 4D, patterning is performed on the mask layer 72 using the photolithography method, openings 73 are formed as the plurality of first openings in the first area F, and an opening 74 is formed as a second opening along the outer edge of the first area F in the peripheral area G.

As shown in FIG. 6A, the respective openings 73 are provided to correspond to the planar central positions of the recesses 12 (shown by dotted lines in FIG. 6A) which are formed in a subsequent process, that is, the planar central positions of the pixels P (refer to FIG. 3). Therefore, the plurality of openings 73 are arranged at a pitch corresponding to an arrangement pitch of the pixels P. In addition, the opening 74 is provided to surround the periphery of the first area F. The width of the opening 74 is substantially the same as the diameter of the opening 73. The surface 11a of the substrate 11 is exposed in the openings 73, and the bottom surface 15a of the groove part 15 is exposed in the openings 74.

As shown in FIG. 6B, the opening 74 is provided on the bottom surface 15a of the groove part 15. Here, when it is assumed that a distance between a corner, in which the bottom surface 15a and the side wall 15b of the groove part 15 are connected in the boundary part C, and the planar center of the opening 74 is E, that a step (distance in the Z direction) between the surface 11a of the substrate 11 and the bottom surface 15a of the groove part 15 is H, and that the depth (distance in the Z direction from the surface 11a to the bottom part) of the recess 12 to be formed is M, it is preferable that M-H≤E. That is, it is preferable that the distance E between the corner, in which the bottom surface 15a and the side wall 15b of the groove part 15 are connected, and the planer center of the opening 74 be equal to or less than a difference between the step H between the surface 11a and the bottom surface 15a of the groove part 15 and the depth M of the recess 12.

When the opening 74 is arranged in the position as described above, in a process to remove the mask layer 72 which will be described later, it is possible to properly remove the mask layer 72 even in the corner of the bottom surface 15a and the side wall 15b of the groove part 15 in the boundary part C. Meanwhile, the distance E between the boundary part C and the opening 74 is greater than the film thickness of the mask layer 72. If the distance E is equal to or less than the film thickness of the mask layer 72, the opening 74 is formed in a film thickness portion corresponding to the sum of the step H and the film thickness of the mask layer 72, and thus it is difficult to form the opening 74.

Substantially, as shown in 5A, the isotropic etching process such as wet etching is performed on the substrate 11 using, for example, an etching solution such as hydrofluoric acid solution, through the plurality of openings 73 and the opening 74 in the mask layer 72. When the isotropic etching process is performed, the plurality of recesses 12 are formed to extend toward the lower part from the surface 11a while centering on the plurality of openings 73 in the first area F. The recess 12 is formed in a concentric shape which includes the opening 73 as a center in the planar view (refer to FIG. 6A). Adjacent recesses 12 of the plurality of recesses 12 may be connected to each other or may be separated from each other.

In addition, in the peripheral area G, a recess 13, which includes the opening 74 as a center and which is continued along the outer edge of the first area F, is formed. The recess 13 is formed in a groove shape along the opening 74 (refer to FIG. 6A) in the planar view. As the etching process is progressed, the recess 13 extends from the bottom surface 15a toward the lower part, extends toward an upper side than the side part and the bottom surface 15a, and is formed across the peripheral area G and the first area F. Therefore, the recess 13 is connected to the recess 12 in the adjacent dummy area D. As a result, since a part of the substrate 11 on the side of the boundary part C of the side wall 15b (refer to FIG. 6B) and the bottom surface 15a of the groove part 15 is removed, a cavity part is generated on the lower part and the side part of the mask layer 72 at the corner of the part which is formed on the bottom surface 15a and the part which is formed on the side wall 15b in the mask layer 72. That is, the mask layer 72 is in a state in which the mask layer 72 is floated in the boundary part C between the peripheral area G and the first area F.

Figure 5B:
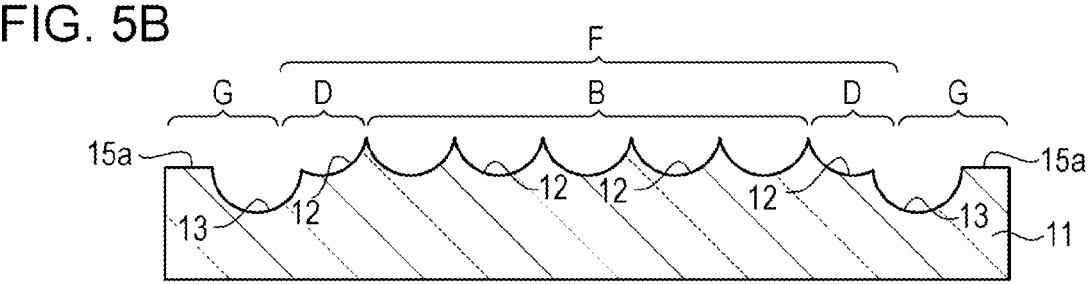
Figure 6A:
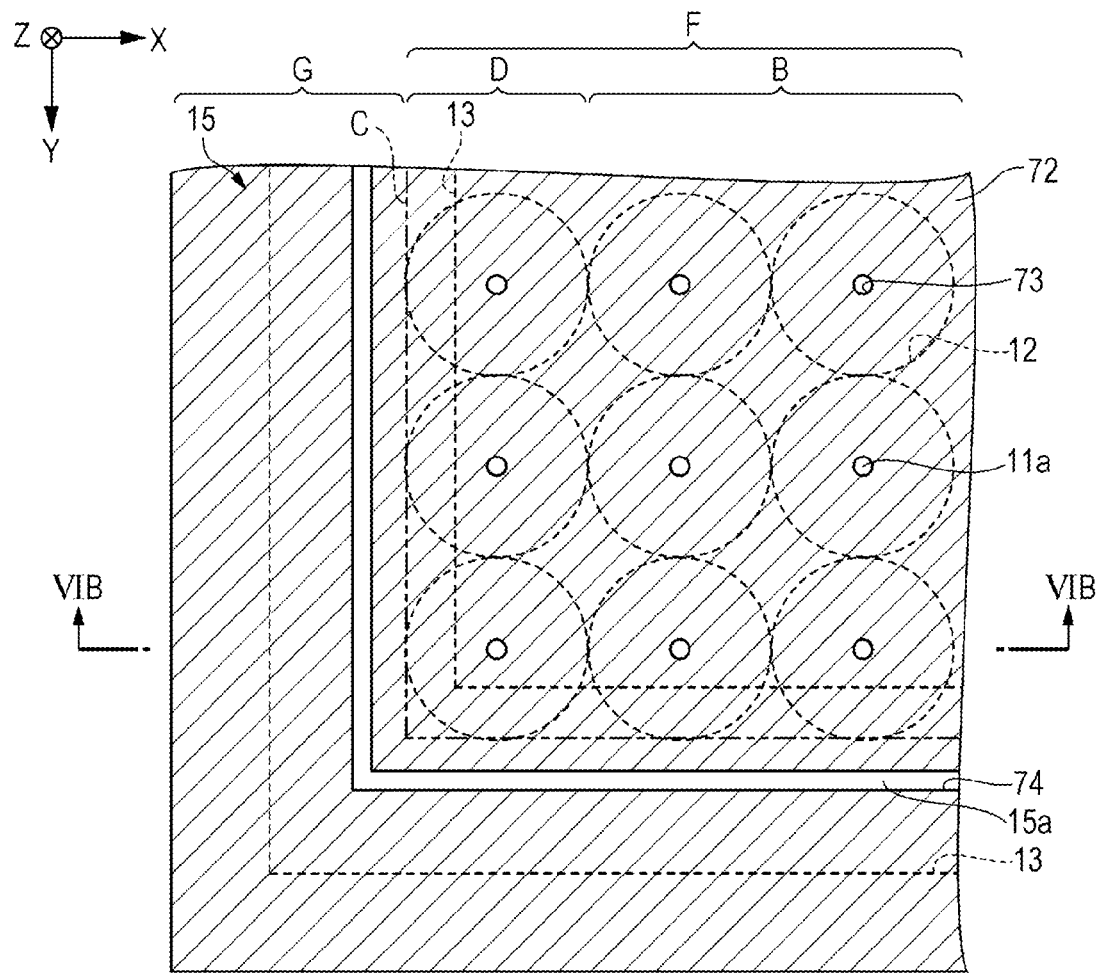
FIGS. 6A and 6B are schematic diagrams illustrating a configuration of a first mask layer which is used in a process to manufacture the microlens array substrate according to the first embodiment.
Figure 6B:
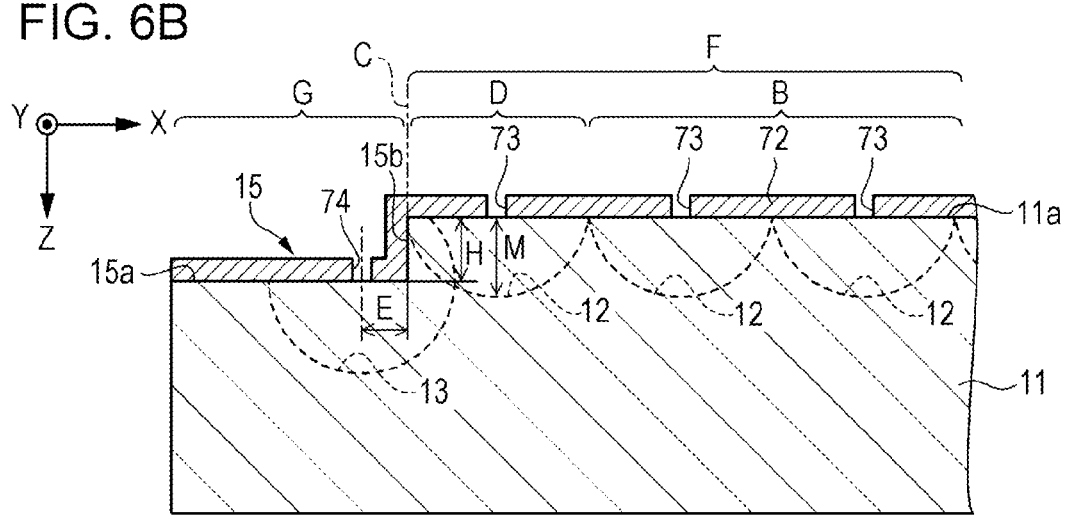

Substantially, when the dry etching process is performed on the mask layer 72 as shown in FIG. 5B, the mask layer 72 is removed from the substrate 11. Therefore, the recesses 12 which are formed in the first area F, and the recess 13 which is formed across the boundary part C between the peripheral area G and the first area F, and the bottom surface 15a are exposed.

Figure 10A:
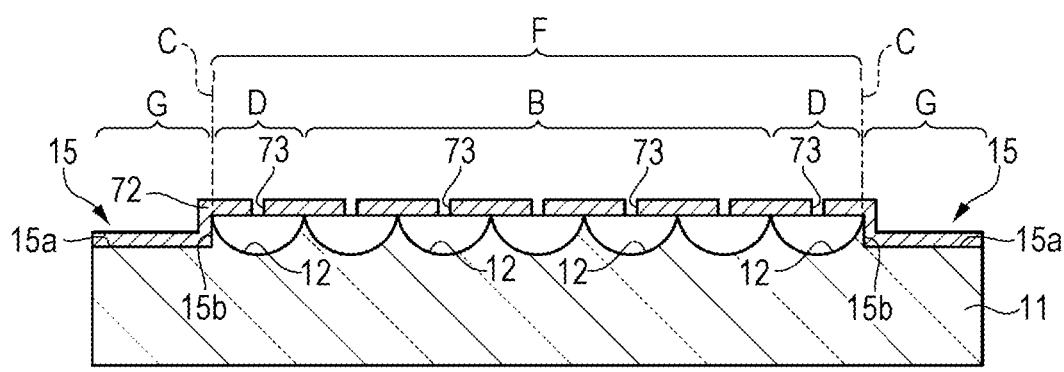
FIGS. 10A and 10B are diagrams illustrating a comparative example.

Here, although the recess 13 is provided in the substrate 11 in the embodiment, a case in which the recess 13 is not provided is supposed. FIG. 10A illustrates a comparative example when the recess 13 is not formed. When the recess 13 is not formed as in the comparative example shown in FIG. 10A, a surface area per unit volume of the mask layer 72 is small at the corner of the bottom surface 15a and the side wall 15b, compared to other portions. Therefore, there is a problem in that a part of the mask layer 72 is not removed and remains. When a part of the mask layer 72 remains, there are cases in which the lens layer 14, which will be subsequently formed, is peeled together with the remaining mask layer 72 and in which cracks appear in the lens layer 14 because stress is applied to the remaining mask layer 72.

In the embodiment, as shown in FIG. 5A, when the recess 13 is formed, the cavity part which is continued along the outer edge of the first area F on the lower part and the side part of the mask layer 72 is generated at the corner of the bottom surface 15a and the side wall 15b (refer to FIG. 6B), and an opening 74 is provided in the vicinity of the corner. Therefore, since the surface area of a portion in which the mask layer 72 is exposed is large at the corner of the bottom surface 15a and the side wall 15b, it is possible to perform removal such that a part of the mask layer 72 does not remain.

Meanwhile, in a process to form the groove part 15, it is possible to perform the isotropic etching (wet etching) process. When the isotropic etching process is performed, an etching solution goes from the opening 74 to the recess 13, and thus it is possible to perform removal such that a part of the mask layer 72 does not remain at the corner of the bottom surface 15a and the side wall 15b similarly to the case in which the anisotropic etching is performed.

Figure 5C:
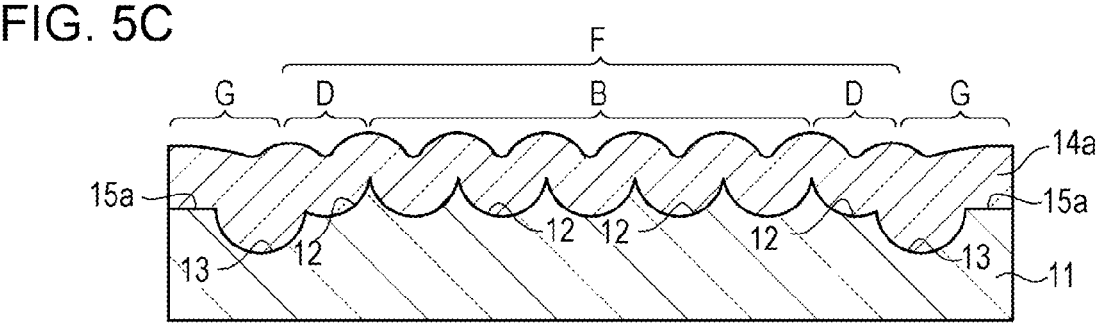

Substantially, as shown in FIG. 5C, a light transmission material layer 14a is formed by accumulating a light transmission material, which is formed of an inorganic material having a refractive index higher than that of the substrate 11, so as to cover the surface 11a of the substrate 11 and bury the plurality of recesses 12 and the recess 13. It is possible to form the light transmission material layer 14a using, for example, the CVD method. The light transmission material layer 14a is formed throughout the first area F and the peripheral area G. The step is reflected in the upper surface of the light transmission material layer 14a due to the recesses 12 and the recess 13.

Figure 5D:
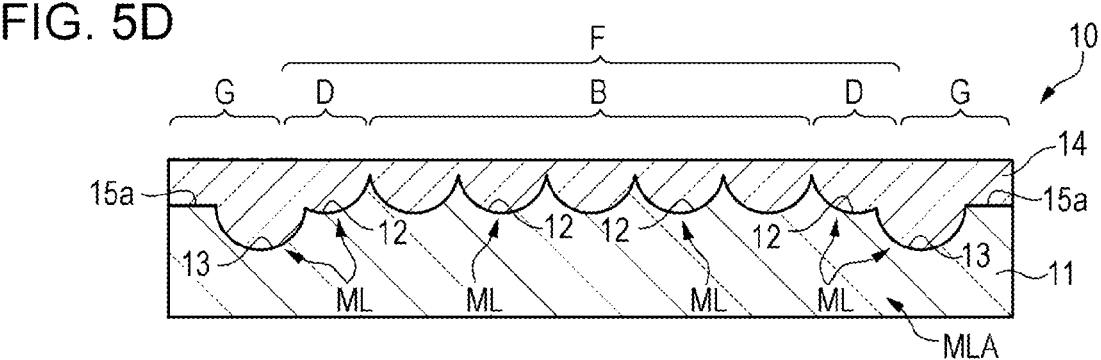

Substantially, as shown in FIG. 5D, a planarizing process is performed on the light transmission material layer 14a. In the planarizing process, the light transmission material layer 14a is planarized by polishing the upper surface of the light transmission material layer 14a using, for example, a Chemical Mechanical Polishing (CMP) process or the like. Therefore, the upper surface of the light transmission material layer 14a is planarized and the lens layer 14 is formed. Meanwhile, a planarizing processing method in the planarizing process is not limited to the CMP process, and an etch back method may be used.

As a result, the microlenses ML are formed by the lens layer 14 which buries the plurality of recesses 12 and the recess 13, and thus the microlens array substrate 10 which includes the microlens array MLA is completed. Meanwhile, sine the microlenses ML corresponding to the recesses 12 and the recess 13, which are arranged in the dummy area D, overlap with the light shielding layers 22, 26, and 32 (refer to FIG. 3) in the planar view, the microlenses ML do not function as microlenses.

Figure 10B:
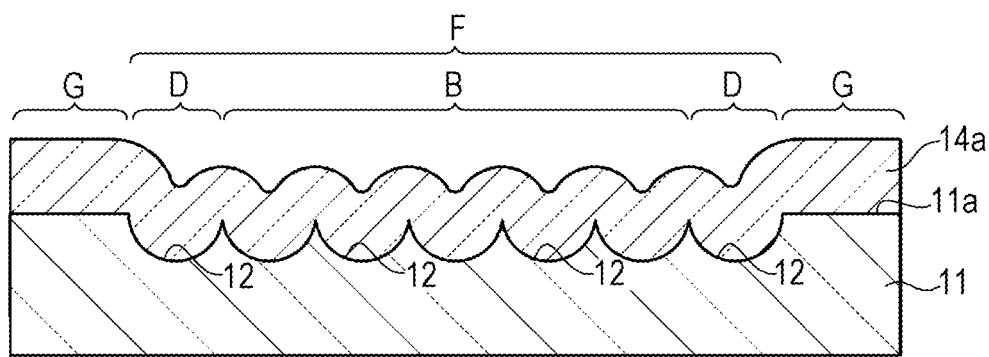

However, the groove part 15 is provided in the substrate 11 in the embodiment, and the embodiment is compared with a case in which the groove part 15 is not provided. FIG. 10B illustrates a comparative example when the groove part 15 is not formed. When the groove part 15 is not formed as in the comparative example shown in FIG. 10B, the upper surface of the light transmission material layer 14a is high in the peripheral area G in which the recesses are not formed compared to the first area F in which the plurality of recesses 12 are formed to be dug down from the surface 11a of the substrate 11, and thus a step is generated on the upper surface of the light transmission material layer 14a. If the step on the upper surface of the light transmission material layer 14a is large, increase in man hour when the planarizing process is performed in the light transmission material layer 14a or decrease in evenness of the upper surface of the light transmission material layer 14a are caused.

In the embodiment, as shown in FIG. 6B, the groove part 15 is formed in the peripheral area G along the outer edge of the first area F in which the plurality of recesses 12 are arranged. Therefore, if the light transmission material layer 14a is formed by accumulating the light transmission material so as to bury the plurality of recesses 12 which cover the side of the surface 11a of the substrate 11 as shown in FIG. 5C, the step between the first area F which is generated on the upper surface of the light transmission material layer 14a and the peripheral area G of the periphery is reduced by the step H between the surface 11a and the bottom surface 15a and becomes less, compared to the case in which the groove part 15 is not formed as in the comparative example shown in FIG. 10B. Therefore, in the process to planarize the upper surface of the light transmission material layer 14a, it is possible to reduce the man hour when the planarizing process is performed and to improve the evenness of the upper surface of the light transmission material layer 14a.

As described above, according to the method of manufacturing the microlens array substrate 10 according to the first embodiment, even when the groove part 15 is provided in the outer edge of the first area F in order to reduce the step on the upper surface of the light transmission material layer 14a, it is possible to perform removal such that a part of the mask layer 72 does not remain at the corner of the bottom surface 15a and the side wall 15b. Therefore, it is possible to improve the evenness of the upper surface of the lens layer 14 and it is possible to provide the microlens array substrate 10 with the improved manufacturing yield and high quality.

Second Embodiment

Figure 7A:
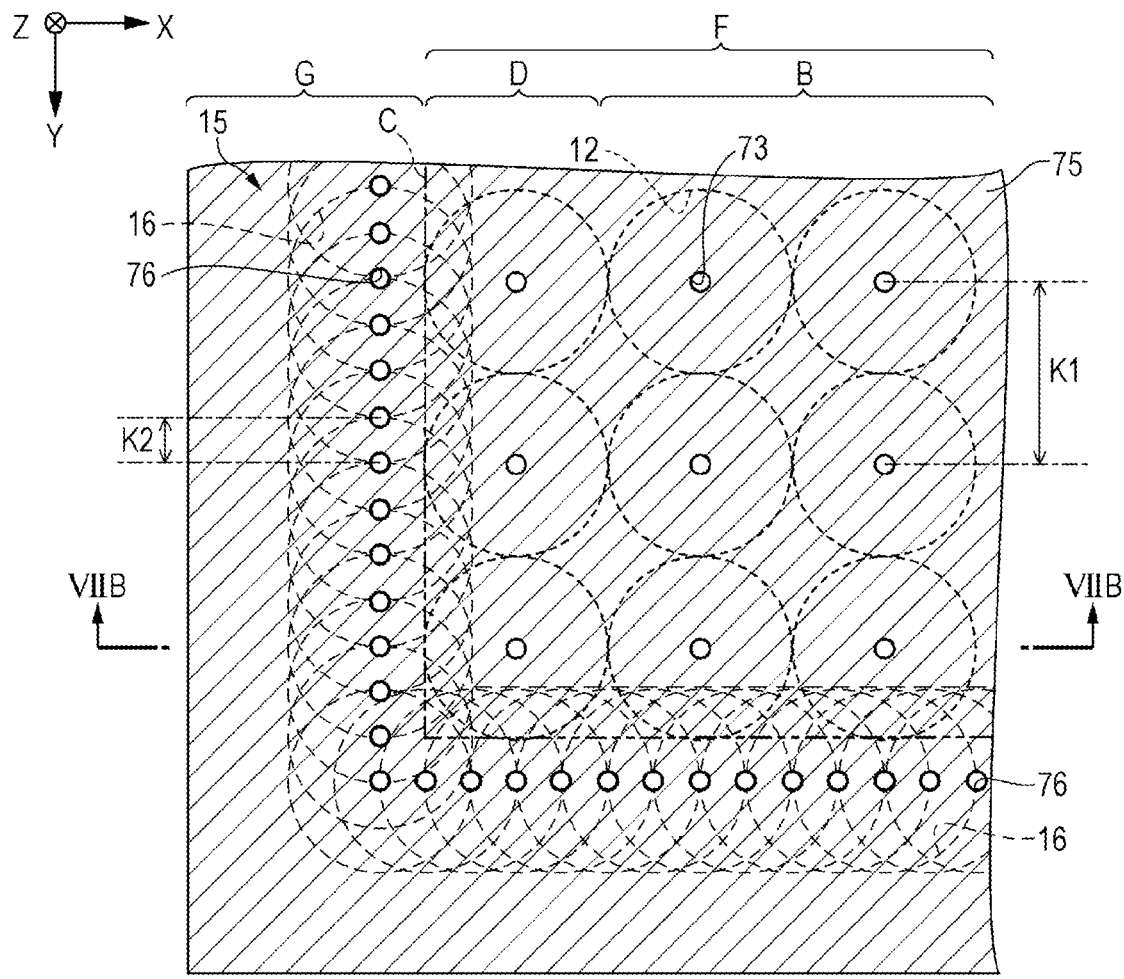
FIGS. 7A and 7B are schematic diagrams illustrating a configuration of a first mask layer which is used in a process to manufacture a microlens array substrate according to a second embodiment.
Figure 7B:
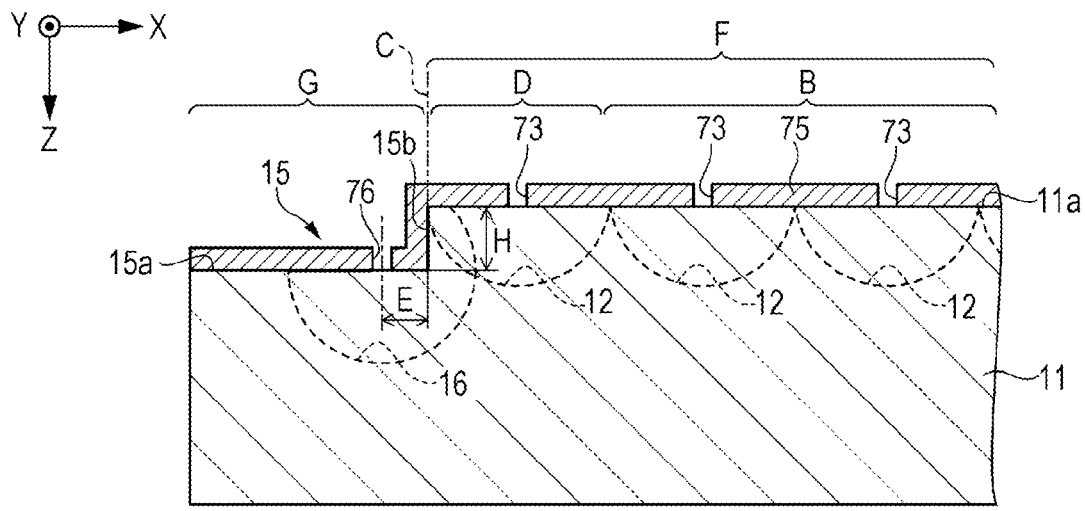

In a second embodiment, a configuration of a second recess, which is formed across the boundary part C between the first area F and the peripheral area G, is different from that in the first embodiment but the other configurations are substantially the same. Therefore, differences in the method of manufacturing the microlens array substrate from that of the first embodiment will be described. FIGS. 7A and 7B are schematic diagrams illustrating a configuration of a first mask layer which is used for a process to manufacture a microlens array substrate according to the second embodiment. More specifically, FIG. 7A is a schematic plan view illustrating the configuration of the first mask layer, and FIG. 7B is a schematic cross-sectional diagram illustrating the configuration of the first mask layer. FIG. 7B corresponds to the cross-sectional diagram taken along a line VIIB-VIIB of FIG. 7A.
Method of Manufacturing Microlens Array Substrate As shown in FIG. 7A, in the second embodiment, a plurality of openings 76 are provided as second openings in the mask layer 75 as the first mask layer using a process to form the plurality of recesses 12 (refer to FIG. 5A). The openings 76 are arranged in plural in the peripheral area G along the outer edge of the first area F. The diameter of each of the openings 76 is substantially the same as the diameter of each of the openings 73. Therefore, the plane area of the recess 16 which is formed based on a single opening 76 as a center is substantially the same as the plane area of the recess 12 which is formed based on the opening 73 as a center.

Here, it is preferable that an interval K2 between the openings 76 be smaller than an interval K1 between the openings 73. For example, if the interval K2 between the openings 76 is the same as the interval K1 between the openings 73, a cavity part is generated in the lower part and the side part of the mask layer 75 at the corner of the bottom surface 15a and the side wall 15b for each formed recess 16. However, a portion which does not include the cavity part remains between the recesses 16.

If the interval K2 between the openings 76 is smaller than the interval K1 between the openings 73, the plurality of recesses 16 are formed in a state in which adjacent recesses 16 are connected to each other. Therefore, as the interval K2 between the openings 76 is small, the portion which does not include the cavity part between the recesses 16 is small. Accordingly, it is possible to provide the cavity part connected along the outer edge of the first area F in the lower part and the side part of the mask layer 75 at the corner of the bottom surface 15a and the side wall 15b.

Therefore, similarly to the first embodiment, in a process to remove the mask layer 75 from the substrate 11, it is possible to perform removal such that a part of the mask layer 75 does not remain at the corner of the bottom surface 15a and the side wall 15b in the second embodiment. Therefore, it is possible to improve the evenness of the upper surface of the lens layer 14, and it is possible to provide the microlens array substrate 10 with the improved manufacturing yield and high quality.

Meanwhile, as shown in FIG. 7B, a cross-sectional shape taken along the line VIIB-VIIB of FIG. 7A in the second embodiment is substantially the same as that in the first embodiment shown in FIG. 6B.

Third Embodiment

Electronic Apparatus

Figure 8:
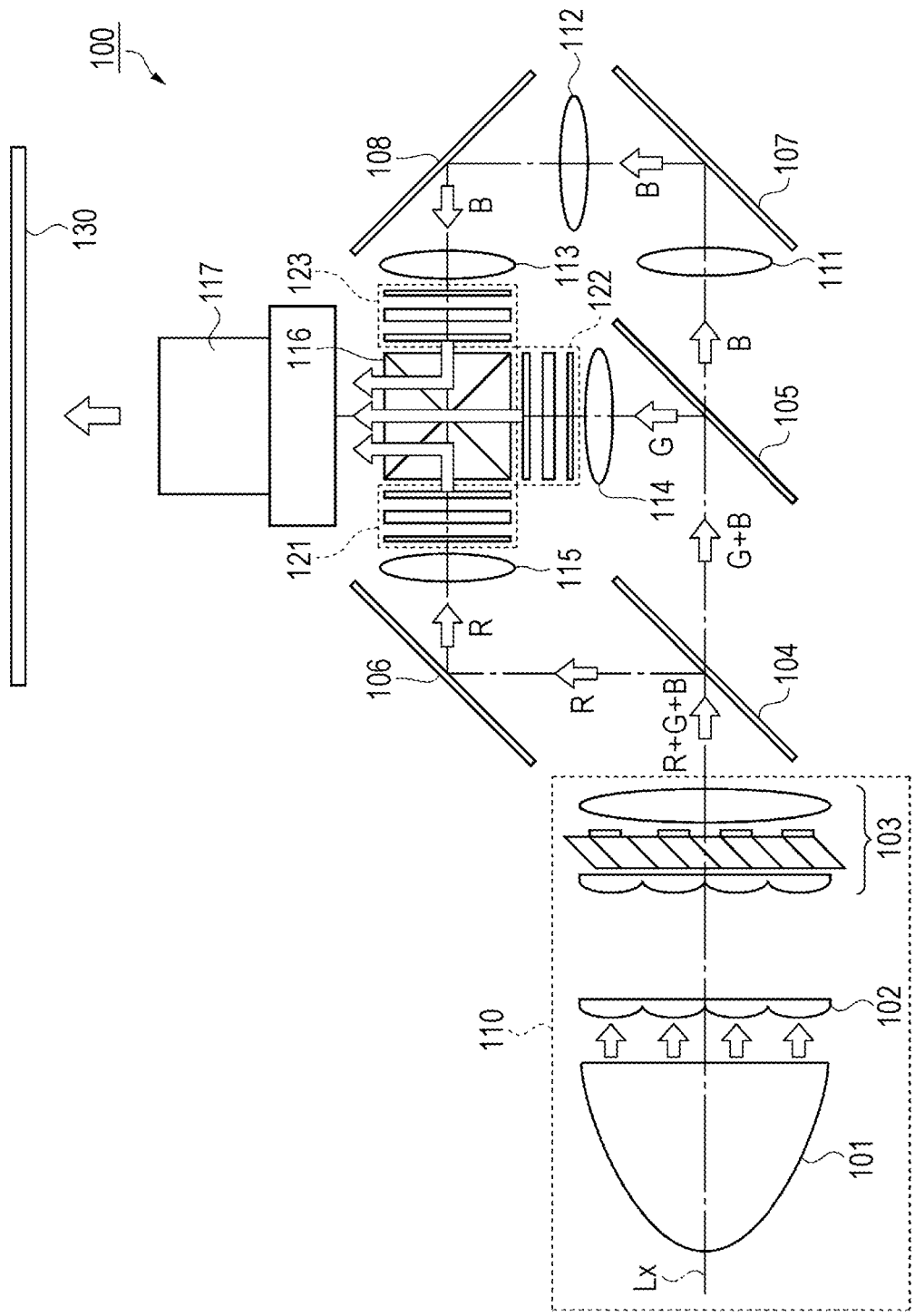
FIG. 8 is a schematic diagram illustrating a configuration of a projector as an electronic apparatus according to a third embodiment.

Substantially, an electronic apparatus according to a third embodiment will be described with reference to FIG. 8. FIG. 8 is a schematic diagram illustrating a configuration of a projector as an electronic apparatus according to the third embodiment.

As shown in FIG. 8, the projector (projection type display apparatus) 100 as the electronic apparatus according to the third embodiment includes a polarization lighting apparatus 110, two dichroic mirrors 104 and 105 as light separating elements, three reflecting mirrors 106, 107, and 108, five relay lenses 111, 112, 113, 114, and 115, three liquid crystal light valves 121, 122, and 123, a cross dichroic prism 116 as a light composition element, and a projection lens 117.

The polarization lighting apparatus 110 includes, for example, a lamp unit 101 as a light source which includes a white light source, such as a ultrahigh pressure mercury lamp or a halogen lamp, an integrator lens 102, and a polarization conversion element 103. The lamp unit 101, the integrator lens 102, and the polarization conversion element 103 are arranged along a system optical axis Lx.

The dichroic mirror 104 reflects red light (R) in polarization light flux emitted from the polarization lighting apparatus 110, and causes green light (G) and blue light (B) to pass through. The other one dichroic mirror 105 reflects green light (G) which passed through the dichroic mirror 104 and causes blue light (B) to pass through.

Red light (R) which is reflected in the dichroic mirror 104 is reflected in the reflecting mirror 106, and is incident to the liquid crystal light valve 121 through the relay lenses 115. Green light (G) which is reflected in the dichroic mirror 105 is incident to the liquid crystal light valve 122 through the relay lens 114. Blue light (B) which passes through the dichroic mirror 105 is incident to the liquid crystal light valve 123 through a light guiding system which includes the three relay lenses 111, 112, and 113 and the two reflecting mirrors 107 and 108.

The transmission type liquid crystal light valves 121, 122, and 123 as optical modulation elements are arranged to respectively face incident surfaces for respective colored light of the cross dichroic prism 116. The colored light incident to the liquid crystal light valves 121, 122, and 123 is modulated based on image information (image signal), and is emitted toward the cross dichroic prism 116.

The cross dichroic prism 116 includes four right-angle prisms which are bonded to each other, and includes a dielectric multi-layer film which reflects red light and a dielectric multi-layer film which reflects blue light therein. The dielectric multi-layer films are formed to cross each other. Three colored light is composed by the dielectric multi-layer films, and light which expresses a color image is composed. The composed light is projected on a screen 130 by the projection lens 117 which is the projection optical system and the image is shown by being enlarged.

The liquid crystal device 1, which includes the microlens array substrate 10 manufactured using the above-described manufacturing method according to the first embodiment or the second embodiment, is applied to the liquid crystal light valve 121. The liquid crystal light valve 121 is arranged with a gap between a pair of polarization elements which are arranged in cross-nicol alignment on the incident side and emission side of the color light. The other liquid crystal light valves 122 and 123 are arranged in the same manner.

According to such a configuration of the projector 100, even though the plurality of pixels P are arranged with high definition, the liquid crystal device 1, which is capable of effectively using incident color light, is provided, and thus it is possible to provide the projector 100 with high quality and brightness.

The above-described embodiments only show aspects of the invention, and arbitrary modification and application are possible without departing from the scope of the invention. As modification examples, for example, examples below may be conceivable.

First Modification Example

Figure 9A:
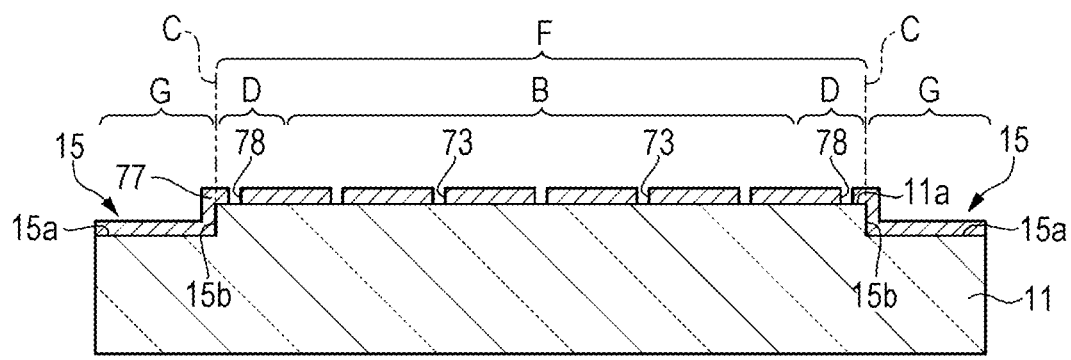
FIGS. 9A and 9B are schematic cross-sectional diagrams illustrating a method of manufacturing a microlens array substrate according to a first modification example.
Figure 9B:
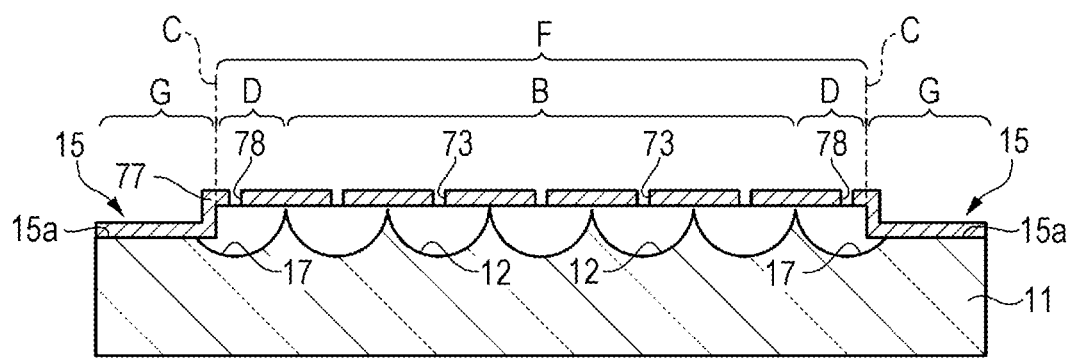

In the method of manufacturing the microlens array substrate according to the above embodiments, the openings 74 and 76 as the second openings, which are formed in the mask layers 72 and 75 as the first mask layer, are configured to be arranged on the groove part 15 in the peripheral area G. However, the invention is not limited to such a form. For example, the second openings may be configured to be arranged in the first area F. FIGS. 9A and 9B are schematic cross-sectional diagrams illustrating a method of manufacturing a microlens array substrate according to a first modification example. Meanwhile, a process shown in FIG. 9A corresponds to the process shown in FIG. 4D according to the first embodiment, and a process shown in FIG. 9B corresponds to the process shown in FIG. 5A according to the first embodiment.

As shown in FIG. 9A, in the method of manufacturing the microlens array substrate according to the first modification example, in a mask layer 77 as a first mask layer, openings 78 as the second openings are formed in the first area F. More specifically, the openings 78 are formed along the outer edge of the display area B in a position in the vicinity of the boundary part C of the dummy area D and the peripheral area G. The openings 78 may be provided in succession similarly to the openings 74 according to the first embodiment, and may be provided in plural similarly to the openings 76 according to the second embodiment. Meanwhile, the plurality of openings 73 are formed in the display area B similarly to the embodiment.

As shown in FIG. 9B, when the isotropic etching process is performed on the substrate 11 through the mask layer 77, the continued recesses 17 or the plurality of recesses 17 are formed along the outer edge of the first area F using the openings 78 as the centers thereof in the dummy area D. The recesses 17 are formed across the boundary part C between the first area F (dummy area D) and the peripheral area G. Therefore, even in a configuration according to the first modification example, a cavity part in which the substrate 11 is removed is generated in the lower part and the side part of the mask layer 77 at the corner of the bottom surface 15a and the side wall 15b. Therefore, similarly to the embodiments, in a process to remove the mask layer 77 from the substrate 11, it is possible to perform removal such that a part of the mask layer 77 does not remain at the corner of the bottom surface 15a and the side wall 15b. Therefore, it is possible to improve the evenness of the upper surface of the lens layer 14 and it is possible to provide the microlens array substrate 10 with the improved manufacturing yield and which high quality.

However, compared to the first modification example, the recess 13, which is formed to correspond to the opening 74, is formed in a lower part than the corner of the bottom surface 15a and the side wall 15b of the groove part 15 in the embodiment. Therefore, in the embodiment, a larger cavity part is generated in the lower part of the mask layer 72 at the corner, and thus it is possible to more properly remove the first mask layer.

Meanwhile, in the first modification example, the openings 78 are provided on the surface 11a of the substrate 11 in the mask layer 77, the openings 78 and the openings 73 are formed at the same height. Therefore, in a case of exposure when the openings 73 and the openings 78 are formed on the mask layer 77, it is possible to cause a distance from an exposure machine to positions where the openings are formed to be substantially the same between the openings 73 and the openings 78. Therefore, it is possible to cause the positions and the precision of the sizes of the diameters of the openings 78 to be equivalent to those of the openings 73.

Second Modification Example

In the embodiments, the lens layer 14 is formed of a material which has a higher photorefractive index than the substrate 11. However, the invention is not limited to such a form. The lens layer 14 may be formed of a material which has a lower photorefractive index than the substrate 11.

Third Modification Example

In the embodiments, the microlens array substrate 10 is included in the counter substrate 30. However, the invention is not limited to the embodiment. For example, the microlens array substrate 10 may be configured to be included in the element substrate 20. In addition, the microlens array substrate 10 may be included in both the element substrate 20 and the counter substrate 30.

Fourth Modification Example

In the embodiments and the modification examples, the microlens array substrate 10 is configured such that the microlenses ML (recesses 12) are arranged in the matrix shape in the display area B. However, the invention is not limited such embodiments. The array of the microlenses ML corresponds to the array of the pixels P, and may be, for example, a different array such as honeycomb array.

Fifth Modification Example

An electronic apparatus to which the liquid crystal device according to the embodiments can be applied is not limited to the projector 100. The liquid crystal device 1 can be suitably used as, for example, a display unit of information terminal equipment such as a projection type Head Up Display (HUD) or a direct-view Head Mounted Display (HMD), or an electronic book, a personal computer, a digital steel camera, a liquid crystal television, a viewfinder-type or direct-view monitor type video recorder, a car navigation system, an electronic organizer, or a POS.

The entire disclosure of Japanese Patent Application No. 2013-201053, filed Sep. 27, 2013 is expressly incorporated by reference herein.

What is claimed is:

1. A method of manufacturing a microlens array substrate in which a plurality of microlenses are arranged in a first area, the method comprising:
    forming a groove part along an outer edge of the first area on a first surface of a substrate;
    forming a first mask layer to cover a side of the first surface of the substrate, forming a plurality of first openings corresponding to the plurality of microlenses in the first area of the first mask layer, and forming second openings along the outer edge of the first area;
    performing isotropic etching on the substrate through the first mask layer, forming a plurality of first recesses corresponding to the plurality of first openings in the first area, and forming second recesses corresponding to the second openings across an edge part on a side of the first area of the groove part;
    removing the first mask layer from the substrate;
    forming a light transmission material layer that has a refractive index, which is different from a refractive index of the substrate, to cover the side of the first surface of the substrate and to bury the plurality of first recesses and the second recesses; and
    planarizing an upper surface of the light transmission material layer.

2. The method of manufacturing a microlens array substrate according to claim 1,
    wherein the forming of the groove part includes:
        forming a second mask layer that covers the first area of the first surface of the substrate;
        forming the groove part by performing anisotropic etching on the substrate through the second mask layer; and
        removing the second mask layer.

3. The method of manufacturing a microlens array substrate according to claim 1,
    wherein the removing of the first mask layer includes performing anisotropic etching on the first mask layer.

4. The method of manufacturing a microlens array substrate according to claim 1,
    wherein the second openings are arranged to extend along the outer edge of the first area.

5. The method of manufacturing a microlens array substrate according to claim 1,
    wherein the forming of the second openings includes forming a plurality of second openings along the outer edge of the first area, and
    wherein an interval between the plurality of second openings is smaller than an interval between the plurality of first openings.

6. The method of manufacturing a microlens array substrate according to claim 1,
    wherein the second openings are arranged in an area which is overlapped with the groove part in a planar view.

7. The method of manufacturing a microlens array substrate according to claim 6,
    wherein a distance between a boundary part and the second openings is equal to or less than a difference between a step of the first surface and the groove part and a depth of the first recess.

8. The method of manufacturing a microlens array substrate according to claim 1,
    wherein the second openings are arranged in the first area.

9. A microlens array substrate comprising:
    a substrate;
    a plurality of first recesses that are provided in a first area of a first surface of the substrate;
    a groove part that is provided along an outer edge of the first area;
    second recesses that are provided across a boundary part between the first area and the groove part; and
    a light transmission layer that has a refractive index, which is different from a refractive index of the substrate, and that is provided to cover the first surface of the substrate and to bury the plurality of first recesses and the second recesses.

10. An electro-optic device comprising:
    a first substrate;
    a second substrate that is arranged to face the first substrate;
    an electro-optic layer that is arranged between the first substrate and the second substrate; and
    the microlens array substrate according to claim 9 that is provided on at least one of the first substrate and the second substrate.

11. An electronic apparatus comprising the electro-optic device according to claim 10.

* * * * *